United States Patent [19]
Okumura et al.

[11] Patent Number: 5,855,194
[45] Date of Patent: Jan. 5, 1999

[54] INTAKE SYSTEM FOR AN INTERNAL COMBUSTION ENGINE

[75] Inventors: Takeshi Okumura, Susono; Shinobu Ishiyama, Numazu, both of Japan

[73] Assignee: Toyota Jidosha Kabushiki Kaisha, Aichi, Japan

[21] Appl. No.: 835,622

[22] Filed: Apr. 9, 1997

[30] Foreign Application Priority Data

Apr. 19, 1996 [JP] Japan .................................. 8-098689

[51] Int. Cl.⁶ .................................................. F02B 31/08
[52] U.S. Cl. .................................................. 123/308
[58] Field of Search .................................... 123/308

[56] References Cited

U.S. PATENT DOCUMENTS

| | | | |
|---|---|---|---|
| 3,020,896 | 2/1962 | Meurer et al. | 123/308 |
| 3,898,966 | 8/1975 | List | 123/308 |
| 4,699,104 | 10/1987 | Okumura | 123/308 |

FOREIGN PATENT DOCUMENTS

| | | |
|---|---|---|
| 0067700 | 12/1982 | European Pat. Off. . |
| 61-241419 | 10/1986 | Japan . |
| 61-250340 | 11/1986 | Japan . |
| 7-158459 | 6/1995 | Japan . |
| 8-246885 | 9/1996 | Japan . |
| WO8605237 | 9/1986 | WIPO . |

*Primary Examiner*—Andrew M. Dolinar
*Attorney, Agent, or Firm*—Kenyon & Kenyon

[57] ABSTRACT

According to the present invention, each of the cylinders of an engine is provided with a first and a second swirl ports for generating a swirl of intake air in the cylinder. The second swirl port is located at the position downstream of the first swirl port with respect to the direction of swirl generated by the first intake port. The helical air passages of the first and the second intake port have a bottom which opens to the cylinder and an upper wall facing the bottom and an end wall defining the end of the helical air passage. The angle $\theta_1$ between the upper wall and the end wall of the helical air passage of the first (upstream) intake port is formed smaller than the same (the angle $\theta_2$) of the helical air passage of the second (downstream) intake port. By forming the angle $\theta_1$ small, intake air flowing through the first intake port rotates a large amount before it flows into the cylinder and a strong swirl is formed by the intake air from the first intake port. On the other hand, since the angle $\theta_2$ is relatively large, intake air flowing through the second intake port flows into the cylinder before it rotates sufficiently. Therefore, the intake air from the second intake port flows into the cylinder without interfering with the swirl in the cylinder. Thus, the flow resistance of the second intake port decreases.

1 Claim, 5 Drawing Sheets

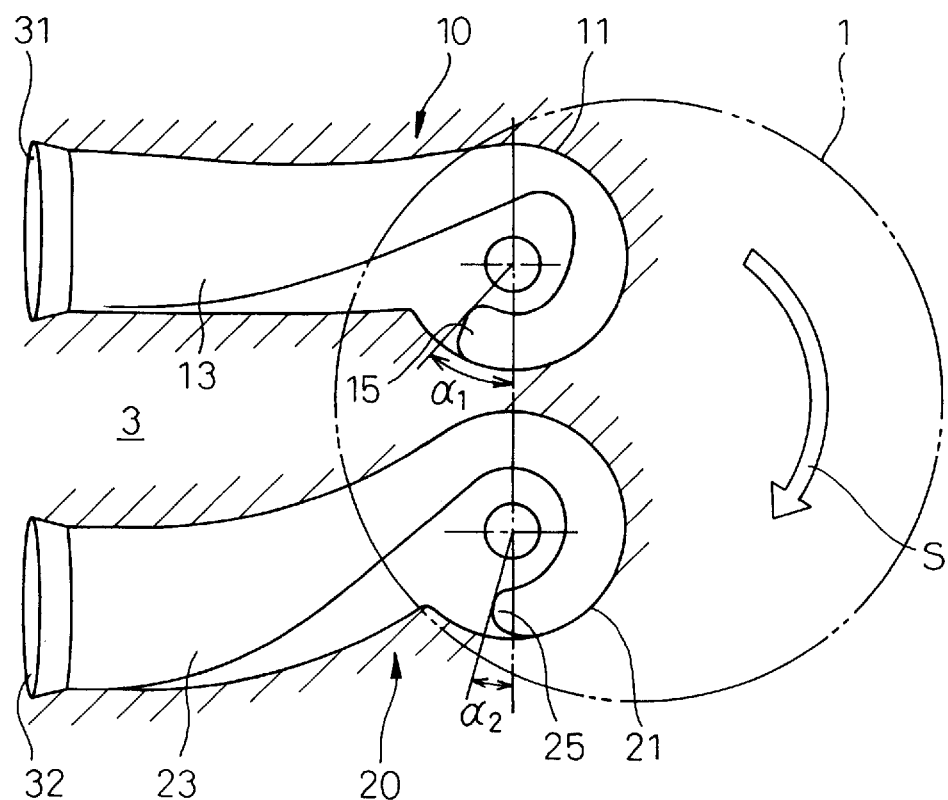

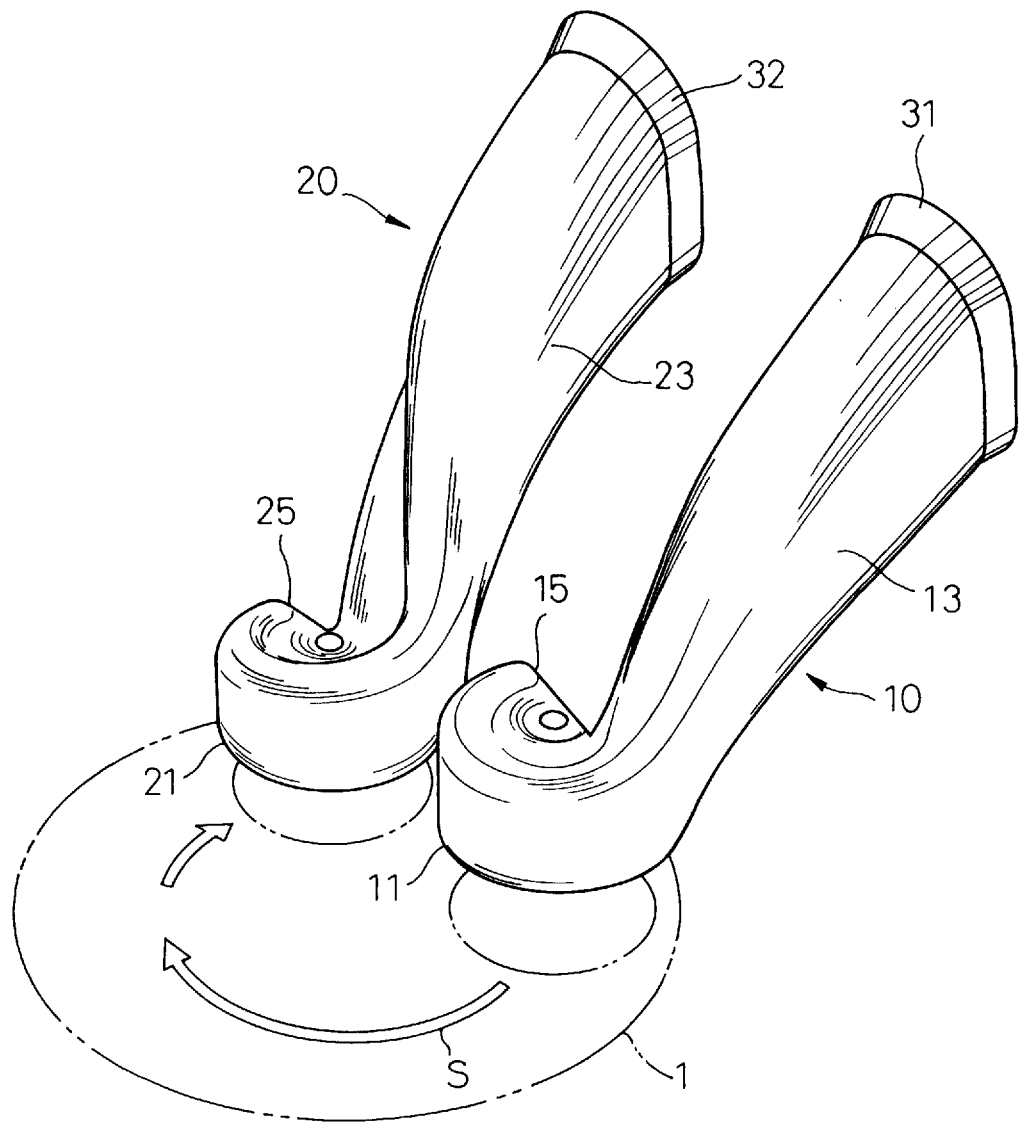

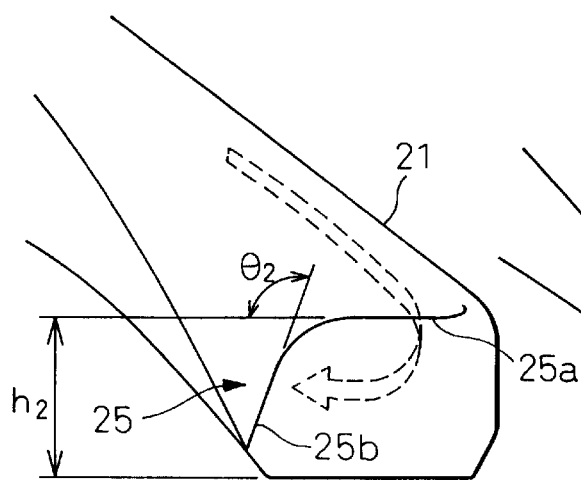
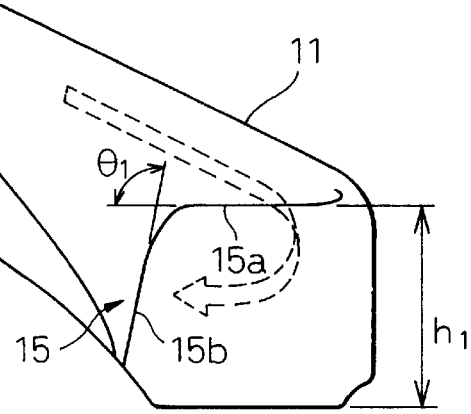

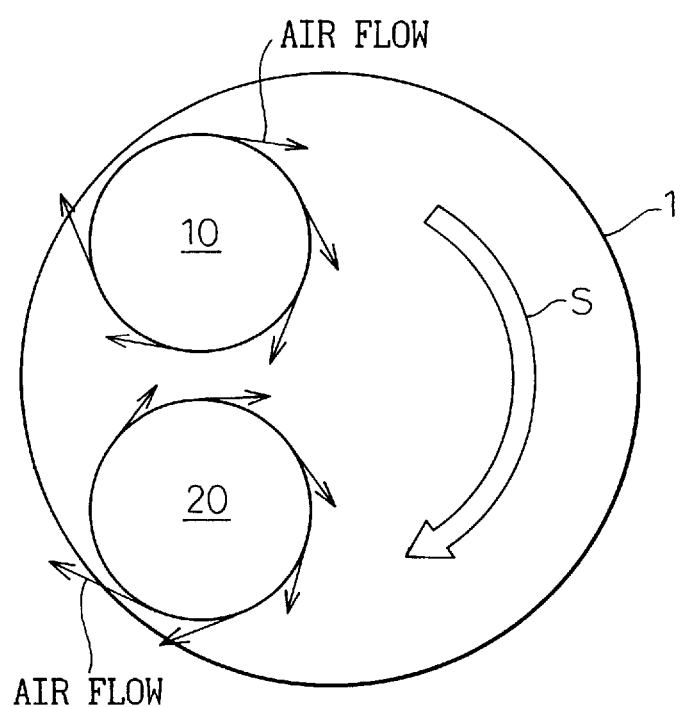

INTAKE SYSTEM FOR AN INTERNAL COMBUSTION ENGINE

BACKGROUND OF THE INVENTION

1. Field of the Invention

The present invention relates to an intake system for an internal combustion engine. More specifically, the invention relates to an intake system having two swirl intake ports on each cylinder of the engine.

2. Description of the Related Art

An intake system in which two swirl intake ports are disposed on each cylinder of the engine in order to generate a strong swirl of intake air in the cylinder is known in the Art. For example, this type of the intake system is disclosed in Japanese Unexamined Patent Publication (Kokai) No. 7-158459. The intake system in the '849 publication disposes two helical type swirl ports on the cylinder. The helical type swirl port has a helical air passage which gives a rotational velocity to the intake air flowing therethrough. In the '849 publication, the swirl port located upstream with respect to the flow direction of the swirl in the cylinder rotates the flow of intake air therethrough by a large amount before it flows into the cylinder while the swirl port located downstream with respect to the swirl in the cylinder rotates the flow of intake air therethrough by only a half turn before it flows into the cylinder.

In the '849 publication, the helical air passage of the upstream swirl port has a relatively large height at the end thereof in order to rotate the flow of intake air by a large amount. In contrast to this, the helical air passage of the downstream swirl port has a relatively small height at the end thereof in order to rotate the flow of intake air therethrough by only a half turn.

By setting the amount of rotation of the flow of intake air through the downstream swirl port small, the tangential (rotational) velocity, i.e., a velocity in the horizontal direction (i.e., the direction perpendicular to the axis of the cylinder), of the intake air at the outlet of the downstream swirl port becomes smaller than the tangential velocity of the upstream swirl port. Therefore, a downward velocity component becomes dominant in the flow of intake air from the downstream swirl port, and the intake air from the downstream swirl port flows downward from the downstream swirl port and is subject to less interference with the cylinder wall. Further, since the flow of the intake air from the downstream swirl port has smaller tangential velocity, the intake air from the downstream swirl port hardly interferes with the swirl of intake air generated by the upstream swirl port. Therefore, the swirl in the cylinder is not disturbed or weakened by interference with the flow of intake air from the downstream swirl port.

In the '849 publication, the amount of rotation of the flow of intake air through the downstream swirl port is kept small by setting the height of the end portion of the helical air passage thereof small. However, in the actual intake system, it is difficult to keep the amount of rotation of intake air small only by setting the height of the end portion of the helical air passage small. Therefore, in some cases system in the '849 publication, the flow of intake air from the downstream swirl port interferes with the cylinder wall and the swirl in the cylinder. Such interference causes an increase in the flow resistance of the downstream swirl port and a decrease in the amount of the intake air therethrough. Further, this interference between intake air from the downstream swirl port and the swirl in the cylinder weakens the swirl. This adversely affect the combustion in the cylinder.

SUMMARY OF THE INVENTION

In view of the problems in the related art as set forth above, the object of the present invention is to provide an intake system for an internal combustion engine in which two swirl intake ports are disposed on each cylinder without causing interference of the flow of intake air from the downstream swirl port with the cylinder wall and the swirl in the cylinder.

This object is achieved by an intake system for an internal combustion engine which comprises a first swirl port and a second swirl port disposed on each of the cylinders of the engine, each of the first swirl port and the second swirl port being provided with an intake air passage of a helical shape which generates a swirl of intake air therethrough within the cylinder. The second swirl port is disposed on the cylinder downstream of the first swirl port with respect to the direction of the swirl generated by the first swirl port. Each of the helical intake air passages of the first and second swirl ports has a bottom extending along the air passage and opening to the cylinder and an upper wall extending along the air passage and facing the bottom and an end wall defining the end of the air passage, and wherein the angle between the upper wall and the end wall of the first swirl port is smaller than the same angle of the second swirl port.

According to the present invention, since the angle between the upper wall and the end wall of the helical air passage of the first (upstream) swirl port is small, the flow of the air through the passage changes its direction suddenly at the end wall. This sudden change in the flow direction generates a vortex at the corner where the upper wall and the end wall meet. Therefore, intake air is pulled by the vacuum generated by the vortex and flows along the upper wall of the passage until It reaches the end wall. Therefore, the flow of intake air through the first swirl port rotates a large amount before it flows into the cylinder. Thus, the intake air flows out from the bottom of the air passage of the first swirl port with a large uniform tangential velocity. Namely, intake air flowing into the cylinder from the first swirl port has a relatively large tangential velocity and a relatively small velocity in the vertical direction (i.e., the direction parallel to the axis of the helix of the helical air passage). Therefore, a strong swirl is generated by the intake air flowing through the first swirl port.

In contrast to the above, the angle between the upper wall and the end wall of the air passage of the second (downstream) swirl port is relatively large, and the flow of the air changes its direction gradually. Therefore, the vacuum generated by the vortex at the corner between the upper wall and the end wall is small, and the force pulling the flow of intake toward the end of the air passage becomes small in the second swirl port. This causes a large amount of intake air flowing through the second swirl port to flow out from the bottom before reaching the end of the passage. Namely, intake air flowing out from the second swirl port has a relatively small tangential velocity since most intake air flows out from the helical air passage before it rotates a large amount.

Further, since the tangential velocity component of the intake air flowing out from the second swirl port becomes larger as the amount of rotation of the intake air in the helical air passage becomes larger, the tangential velocity distribution of intake air around the circumference of the outlet of the second swirl port is such that the tangential velocity of air becomes larger as the end of the helical air passage is approached. This makes the tangential velocity of the intake air flowing into the cylinder from the portion remote from the cylinder wall small, and at this portion, the intake air from the second swirl port flows into the cylinder in an oblique downward direction. Therefore, the swirl in the cylinder is not disturbed or weakened by the intake air from the second swirl port.

Further, since the tangential velocity of intake air from the second swirl port becomes larger at the point near the cylinder wall, intake air from the second swirl port flows along the curvature of the cylinder wall without impinging the cylinder wall.

BRIEF DESCRIPTION OF THE DRAWINGS

The present invention will be better understood from the description as set forth hereinafter, with reference to the accompanying drawings in which:

FIG. 1 shows a plan view of an embodiment of the present invention;

FIG. 2 shows a perspective view of the swirl ports of the embodiment of the present invention;

FIGS. 3A and 3B illustrate the configurations of the end portions of the helical air passages of the swirl ports;

FIG. 5 schematically illustrates the flows of the intake air flowing into the cylinder from the swirl ports.

DESCRIPTION OF THE PREFERRED EMBODIMENT

Figure 4A:
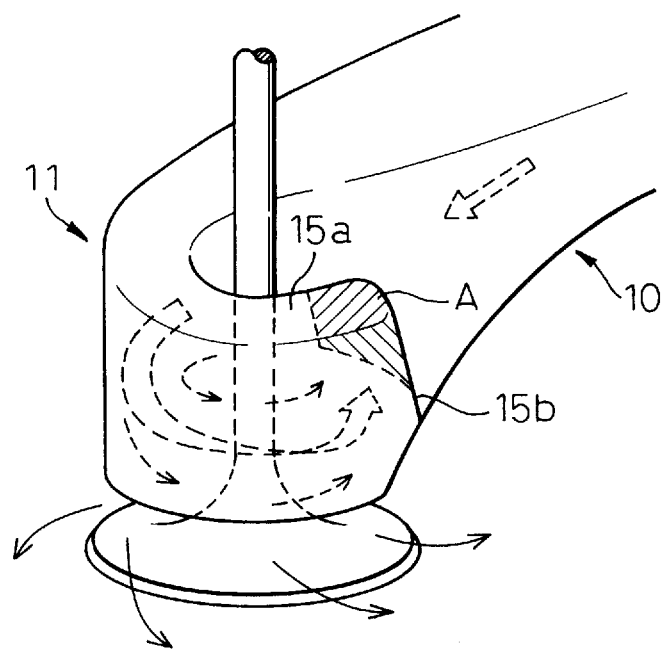
FIGS. 4A and 4B schematically illustrate the flows of the intake air passing through the helical air passages of the swirl ports.

FIG. 1 shows a plan view of a cylinder head of an internal combustion engine to which the intake system of the present invention is applied. In FIG. 1, reference numeral 1 designates a cylinder of the engine, 10 and 20 designate a first and a second intake ports of the cylinder, respectively. The intake ports 10 and 20 are formed in the cylinder head 3, and comprise air passages 13 and 23, respectively, which connect the openings 31, 32 disposed on an end surface of the cylinder head 3 to helical air passages 11 and 21 of the intake ports. Bottoms of the helical air passages 11 and 21 open to an inner space of the cylinder.

Although not shown in the drawing, intake valves which open and close the bottoms of the helical air passages are disposed at the intake ports 10 and 20. The stems of the intake valves extend along center axes of the helical air passages 11 and 12 and are connected to a valve driving mechanism. Further, two exhaust valves (not shown in the drawing) are disposed on the cylinder at the positions symmetrical to the intake valves with respect to the center of the cylinder.

In this embodiment, the helical air passages 11 and 12 have clockwise turns as shown in FIG. 1, and the intake air flowing through the passages 11 and 12 form a clockwise swirl in the cylinder as indicated by S in FIG. 1. Therefore, with respect to the direction of swirl S, the second intake port 20 is located downstream of the first intake port 10.

FIG. 2 is a perspective view showing the shapes of the intake ports 10 and 20. In this embodiment, intake air flows into the intake ports 10 and 20 from intake pipes (not shown) connected to the openings 31 and 32, and flows through the air passages 13 and 23 and into the helical air passages 11 and 21. In the helical air passages 11 and 21, the intake air rotates in a clockwise direction and flows into the cylinder 1 from the bottom opening of the helical air passages 11 and 21. Therefore, the intake air flowing into the cylinder 1 from the bottoms of the helical air passages 11 and 21 has velocity components in directions tangential to the circumferences of the bottoms of the helical air passages 11 and 21. This causes the intake air flowing out from the intake ports 10 and 20 to rotate along the cylinder wall and, thereby, a strong swirl of intake air (as indicated by S in FIG. 1) is formed in the cylinder.

In FIGS. 1 and 2, numerals 15 and 25 designate the end portions of helical air passages 11 and 21, respectively. In this embodiment, the helical air passages 11 and 21 are disposed in such a manner that the angle between the line connecting the center of helical air passages 11 and 21 and the end portion 25 of the helical air passage 21 of the second intake port 20 (the angle $\alpha_2$ in FIG. 1) is smaller than the same (angle $\alpha_1$) of the first intake port 10 in order to avoid interference between the cylinder wall and the end portion 25 of the helical air passage 21.

FIGS. 3A and 3B schematically illustrate the sections of the end portions 15 and 25 of the helical air passages 11 and 21 taken along the stream lines (the arrows in FIGS. 3A and 3B) of the intake air through the helical air passages 11 and 21. As can be seen from FIGS. 3A and 3B, the height $h_1$ of the section of the end portion 15 of the helical air passage 11 is larger than the height $h_2$ of the section of the end portion 25 of the helical air passage 21.

Further, as can be seen from FIG. 3A, the angle $\theta_1$ between the upper wall 15a and the end wall 15b (which define the end of the passage 11) is relatively small, i.e., the end wall 15b is formed so that the inclination thereof is relatively large (steep). In contrast to this, the angle $\theta_2$ between the upper wall 25a and the end wall 25b of the helical air passage 21 is relatively large, i.e., the end wall 25b is formed so that the inclination thereof is relatively small.

Figure 4B:
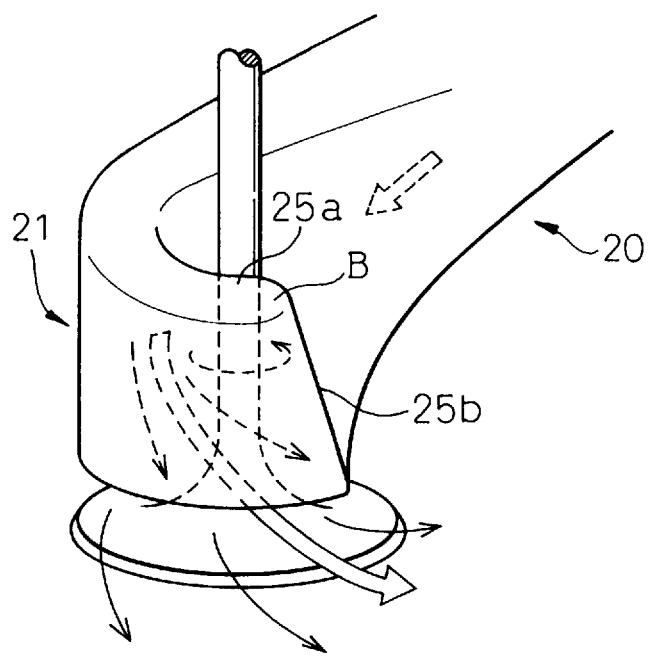

FIGS. 4A and 4B show the difference in the flow of intake air in the passages 11 and 21 due to the difference in the angles $\theta_1$ and $\theta_2$ in this embodiment. FIG. 4A shows the flow of intake air in the first intake port 10. Since the angle $\theta_1$ between the upper wall 15a and the end wall 15b of the end portion is relatively small and the inclination of the end wall 15b is large, the flow in the helical air passage 11 of the first intake port 10 suddenly changes its direction in order to proceed along the end wall 15b. This sudden change in the flow direction causes the separation of the flow at the corner between the upper wall 15a and the end wall 15b (the portion indicated by A in FIG. 4A) and a vortex is generated by this separation of the flow. Since a negative pressure is generated in the portion A by the vortex, the flow of the intake air in the passage 11 is attracted by the negative pressure, and proceeds along the upper wall 15a until it reaches the corner portion A. Therefore, the flow of the intake air rotates a large amount in the passage 11 in the first intake port 10 before it flows into the cylinder 1. Thus, as can be seen from FIG. 4A, the intake air flows out from the bottom of the helical air passage 11 with a relatively large tangential velocity substantially uniform over the entire circumference of the bottom of the passage 11.

On the contrary, the angle $\theta_2$ between the upper wall 25a and the end wall 25b of the helical air passage 21 of the second intake port 20 is larger than the angle $\theta_1$ in the helical air passage 11 of the first intake port 10. Therefore, the flow of intake air changes its direction gradually to proceed along the end wall 25b at the end portion 25 of the passage 21. Since the flow direction gradually changes, no vortex, i.e., no negative pressure is generated at the corner B between the upper wall 25a and the end wall 25b in the passage 21. Therefore, since no negative pressure for attracting the flow of intake air to the corner B of the end portion 25, the intake air in the helical air passage 21 flows out from the bottom of the passage before it rotates a large amount. Thus, the air flowing into the cylinder from the second intake port 20 has a relatively large downward velocity and a relatively small tangential velocity as can be seen from FIG. 4B.

Namely, intake air from the first intake port 10 flows into the cylinder 1 in an almost horizontal direction as shown in FIG. 4A while intake air from the second intake port 20 flows into the cylinder 1 in an oblique downward direction as shown in FIG. 4B.

FIG. 5 schematically illustrates the distribution of the tangential velocity of inlet air flowing into the cylinder 1 around the intake ports 10 and 20. By setting the angle $\theta_1$ at a relatively small value, intake air flowing into the cylinder 1 from the first intake port 10 has a large, uniform tangential velocity distribution around the circumference of the outlet of the port 10. This large, uniform tangential velocity distribution generates a strong swirl S in the cylinder 1, i.e., by setting the angle $\theta_1$ at a relatively small value, the swirl of the intake air in the cylinder is strengthened.

On the other hand, by setting the angle $\theta_2$ at a relatively large value, intake air from the second intake port 20 flows into the cylinder 11 before it rotates by a large amount in the helical air passage 21 (i.e., before the tangential velocity of the intake air becomes large). Therefore, the intake air from the second intake port 20 flows into the cylinder in an oblique downward direction. Further, as can be seen from the velocity distribution in FIG. 5, the tangential velocity of intake air around the outlet of the second intake port 20 increases in the clockwise direction and becomes a maximum at the portion near the cylinder wall. Due to this relatively large tangential velocity, intake air flowing out from the portion of the outlet of the second intake port 20 near the cylinder wall increases the swirl S caused by the intake air from the first intake port 10.

Further, since the tangential velocity of intake air flowing out from the part of the outlet of the second intake port 20 remote from the cylinder is relatively small, intake air from this part of the second intake port 20 flows into the cylinder in the downward direction without interfering with the swirl S in the cylinder. Since the air flowing into the cylinder from the second intake port 20 does not impinge on the cylinder wall or interfere with the swirl in the cylinder, the flow resistance of the second intake port 20 becomes small in this embodiment. Namely, the amount of intake air through the second intake port 20 is increased, in this embodiment, by decreasing the flow resistance by setting the angle $\theta_2$ at a large value.

For example, in a diesel engine, since a throttle valve is not provided, the performance of the engine is largely affected by the condition of the swirl in the cylinder. Therefore, when a diesel engine is operated at a low speed, it is required to improve the combustion in the cylinder by generating a strong swirl of intake air in the cylinder. On the contrary, when the diesel engine is operated at a high speed and a high load, it is necessary to supply a sufficient amount of intake air to the cylinder to prevent the excess air ratio of the cylinder from becoming excessively low.

When the intake system of the present invention is applied to a diesel engine, a strong swirl is formed by the intake air from the first intake port even when the engine is operated at a low speed. Therefore, improved combustion is obtained even in the low speed operation of the diesel engine. Further, since the flow resistance of the second intake port is low, a sufficient amount of intake air is supplied through the second intake port even when the engine is operated at a high speed and a high load. Therefore, the performance of the diesel engine can be improved over a wide operating speed range according to the present invention.

We claim:

1. An intake system for an internal combustion engine comprising a first swirl port and a second swirl port disposed on a cylinder of the engine, each of the first and second swirl ports including a helical intake air passage for generating a swirl of intake air in each of the swirl ports the first swirl port generating a cylinder swirl around the cylinder in a plane substantially perpendicular to a longitudinal axis of the cylinder and the second swirl port introducing air into the cylinder in the same direction as the cylinder swirl without interfering with the cylinder swirl wherein each of the helical intake air passages of the first and second swirl ports includes a first surface extending substantially parallel to and facing an opening into the cylinder, a second surface extending along the periphery of said opening and an end wall extending along the second surface from the first surface toward the opening to define an end of the air passage, and wherein a first angle formed between the first surface and the end wall of the first swirl port is smaller than a second angle formed between the first surface and the end wall of the second swirl port.

* * * * *